United States Patent
Lee et al.

(10) Patent No.: US 11,651,612 B2
(45) Date of Patent: May 16, 2023

(54) FINGERPRINT SENSING APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Chia-Hsun Tu, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 151 days.

(21) Appl. No.: 17/020,757

(22) Filed: Sep. 14, 2020

(65) Prior Publication Data

US 2022/0083757 A1 Mar. 17, 2022

(51) Int. Cl.
*G06V 40/13* (2022.01)
*G06V 10/98* (2022.01)
(Continued)

(52) U.S. Cl.
CPC .......... *G06V 40/1306* (2022.01); *G01D 5/24* (2013.01); *G06F 3/044* (2013.01); *G06F 3/0418* (2013.01);
(Continued)

(58) Field of Classification Search
CPC .................. G06F 3/0418; G06F 3/044; G06F 2203/04107; G06F 2203/04109; G06V 10/98; G06V 40/1306; G01D 5/24
See application file for complete search history.

(56) References Cited

U.S. PATENT DOCUMENTS

| | | | |
|---|---|---|---|
| 2009/0046077 A1* | 2/2009 | Tanaka | G06F 3/0444 345/174 |
| 2015/0212613 A1* | 7/2015 | Fowlkes | G06F 1/16 174/253 |

(Continued)

FOREIGN PATENT DOCUMENTS

WO 2018086054 A1 5/2018

OTHER PUBLICATIONS

Office Action dated Apr. 13, 2022 of the corresponding Indian patent application No. 202041040545.

*Primary Examiner* — Ryan A Lubit
(74) *Attorney, Agent, or Firm* — Chun-Ming Shih; HDLS IPR Services

(57) ABSTRACT

A fingerprint sensing apparatus includes a plurality of fingerprint sensing electrodes, a plurality of data lines respectively sandwiched by a first capacitance-shielding wire and a second capacitance-shielding wire, a fingerprint sensing circuit including a driver circuit with a gain larger than zero or equal to zero. During fingerprint sensing, the fingerprint sensing circuit sends a capacitance-exciting signal to a selected fingerprint sensing electrode, receiving a fingerprint sensing signal from the selected fingerprint sensing electrode, processing the fingerprint sensing signal with the driver circuit into a capacitance-eliminating signal and applying the capacitance-eliminating signal to the first capacitance-shielding wire and the second capacitance-shielding wire respectively. The capacitance between the first/second capacitance-shielding wire and the corresponding data line can be greatly reduced because the voltages at the first/second capacitance-shielding wire have same phase as that of corresponding data line, thus greatly enhance the accuracy of the fingerprint sensing apparatus.

13 Claims, 14 Drawing Sheets

(51) Int. Cl.
*G01D 5/24* (2006.01)
*G06F 3/041* (2006.01)
*G06F 3/044* (2006.01)

(52) U.S. Cl.
CPC .... *G06V 10/98* (2022.01); *G06F 2203/04107* (2013.01)

(56) References Cited

U.S. PATENT DOCUMENTS

| | | | |
|---|---|---|---|
| 2016/0224818 A1* | 8/2016 | Song | G06F 1/1637 |
| 2017/0068365 A1* | 3/2017 | Liu | G06F 3/0448 |
| 2017/0371449 A1* | 12/2017 | Hu | G06F 3/0443 |
| 2018/0025203 A1* | 1/2018 | Lee | G06F 3/0446 |
| | | | 382/124 |
| 2019/0101998 A1* | 4/2019 | Peng | G02F 1/13338 |
| 2019/0102006 A1* | 4/2019 | Suzuki | G01D 5/24 |

\* cited by examiner

FINGERPRINT SENSING APPARATUS

BACKGROUND OF THE INVENTION

Field of the Invention

The present invention relates to a fingerprint sensing apparatus, especially to a fingerprint sensing apparatus with capacitance-shielding wire.

Description of the Prior Art

Biometric identification technologies have rapid development due to the strong demand from electronic security applications and remote payment. For the considerations of efficiency, safety and non-invasiveness, the fingerprint identification becomes main stream technology.

As the frameless smart phone becomes popular, inside-display fingerprint sensing is also under extensive research. Supersonic fingerprint sensing and optical fingerprint sensing can achieve inside-display fingerprint sensing; however, they are expensive and difficult to align. The capacitive fingerprint sensor using TFT technology to arrange sensing electrode and switches on protective glass provides a more economical solution. However, the thickness of the protective glass is around hundreds of micro meters (um) such that the sensing signal is minute. The data line has length of several centimeters and the area thereof is larger than that of a single sensing electrode. More particularly, the separating between the adjacent data lines is only several micro meters to cause serious crosstalk and interference therebetween. The conventional way to block noise by connecting the conductive electrode to ground will induce considerable self-capacitance. The minute sensing signal becomes vanished to worsen the sensing issue. It is important task to solve the noise sensed by the data line.

SUMMARY OF THE INVENTION

It is an object of the present invention to overcome the problem in prior art where the data line senses noise from ambient environment.

Accordingly, the present invention provides a fingerprint sensing apparatus, comprising: a substrate; a fingerprint electrode layer comprising a plurality of fingerprint sensing electrodes; a transistor switch set layer comprising: a plurality of transistor switch sets, each of the transistor switch sets being in one-by-one correspondence with one of the plurality of fingerprint sensing electrodes; and a plurality of data lines, a first capacitance-shielding wire and a second capacitance-shielding wire being provided for a corresponding data line in the plurality of data lines and sandwiching the corresponding data line, wherein the first capacitance-shielding wire is placed between the corresponding data line and a user finger to eliminate an influence of the user finger to the corresponding data line; a fingerprint sensing circuit comprising a capacitance-exciting signal source and a driver circuit, wherein a gain of the driver circuit is larger than zero or equal to zero; wherein the fingerprint sensing circuit is configured to send a capacitance-exciting signal to a selected fingerprint sensing electrode through one of the plurality of transistor switch sets, to receive a fingerprint sensing signal from the selected fingerprint sensing electrode, and to process the fingerprint sensing signal with the driver circuit to output a capacitance-eliminating signal having a same phase as the fingerprint sensing signal, the fingerprint sensing circuit is further configured to send the capacitance-eliminating signal to the first capacitance-shielding wire and the second capacitance-shielding wire for enhancing fingerprint sensing accuracy.

According to the fingerprint sensing apparatus of the present invention, the first capacitance-shielding wire and the second capacitance-shielding wire have voltage with same phase as that of the corresponding data line. Therefore, the capacitance between the first capacitance-shielding wire/the second capacitance-shielding wire and the corresponding data line can be reduced to enhance the sensing accuracy of the fingerprint sensing apparatus of the present invention.

BRIEF DESCRIPTION OF DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Hereinafter, the embodiments of the present invention will be described with reference to the associated drawings. It should be noted various exemplary embodiments shown in the figures are merely illustrative representations and are not necessarily the limit of the claim scope.

Figure 1A:
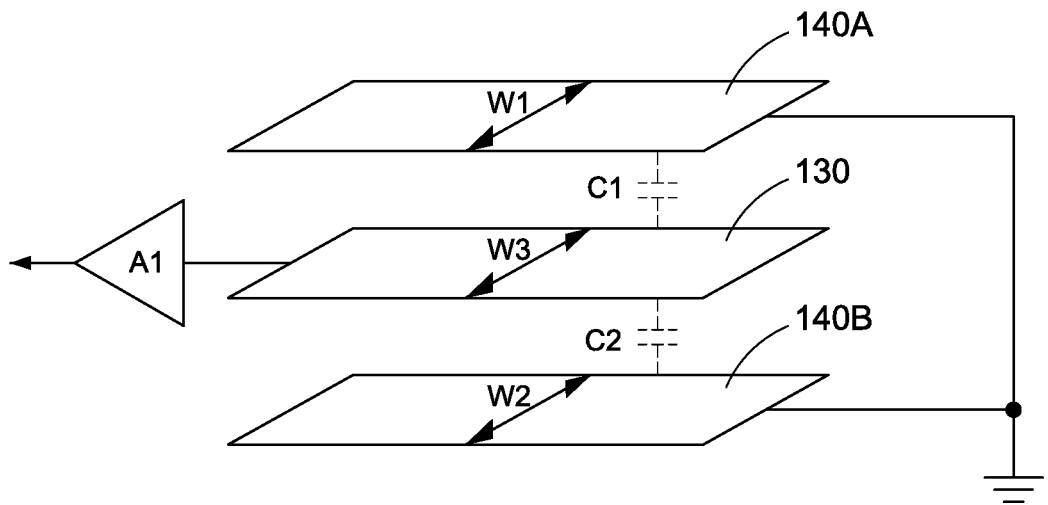
FIGS. 1A to 1C respectively demonstrate the theory for the fingerprint sensing apparatus with capacitance-shielding wire according to the present invention.
Figure 1B:
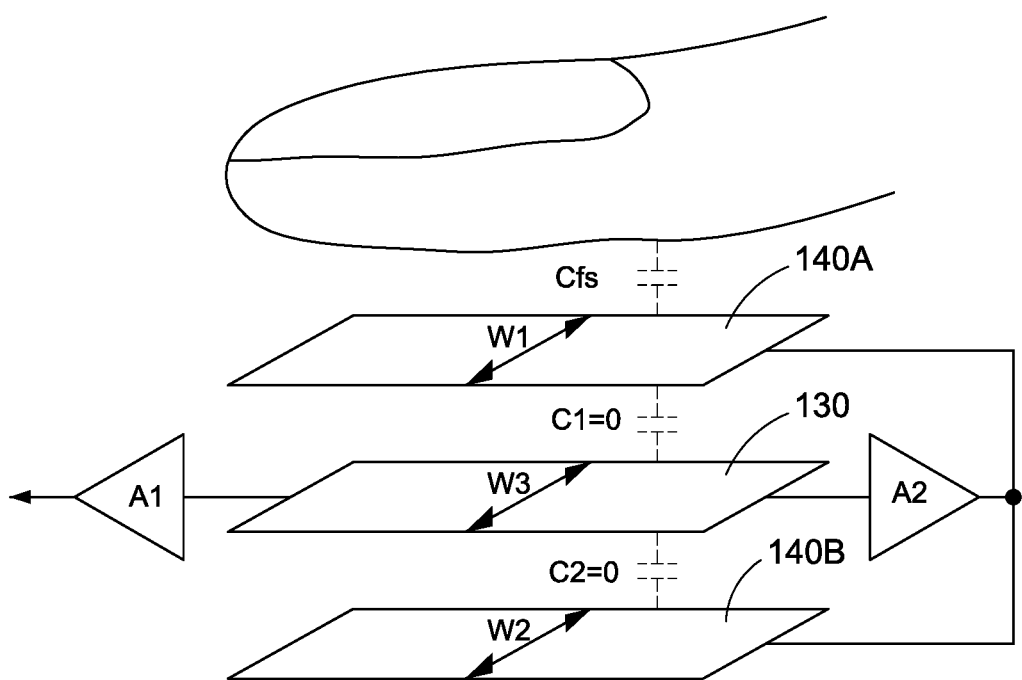
Figure 1C:
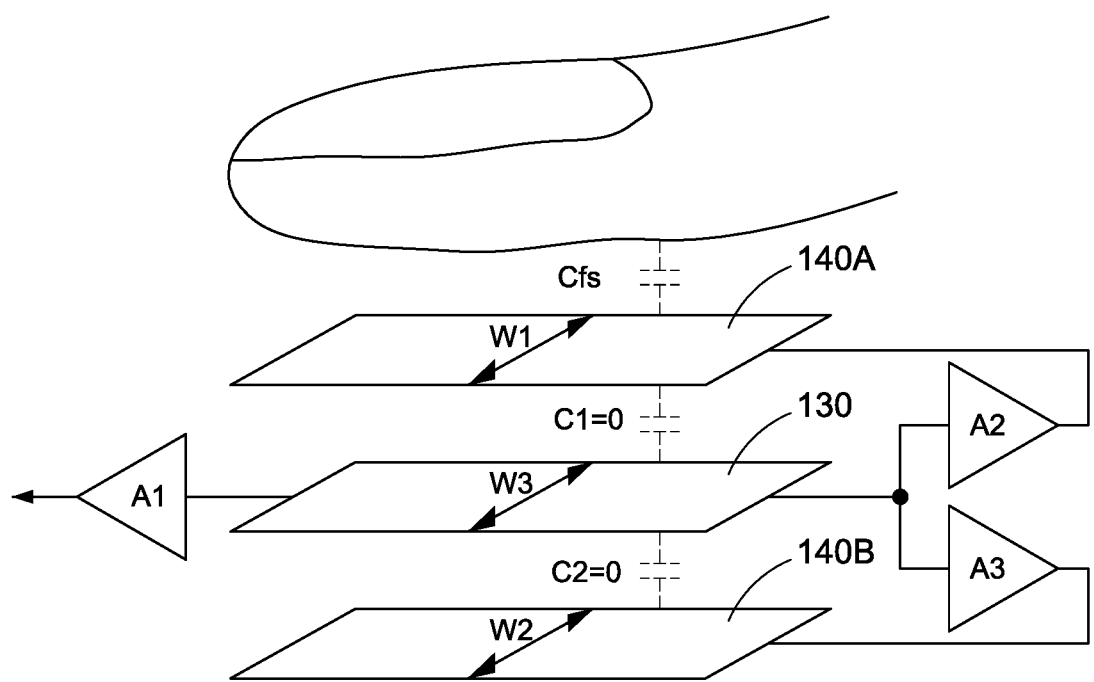
Figure 4:
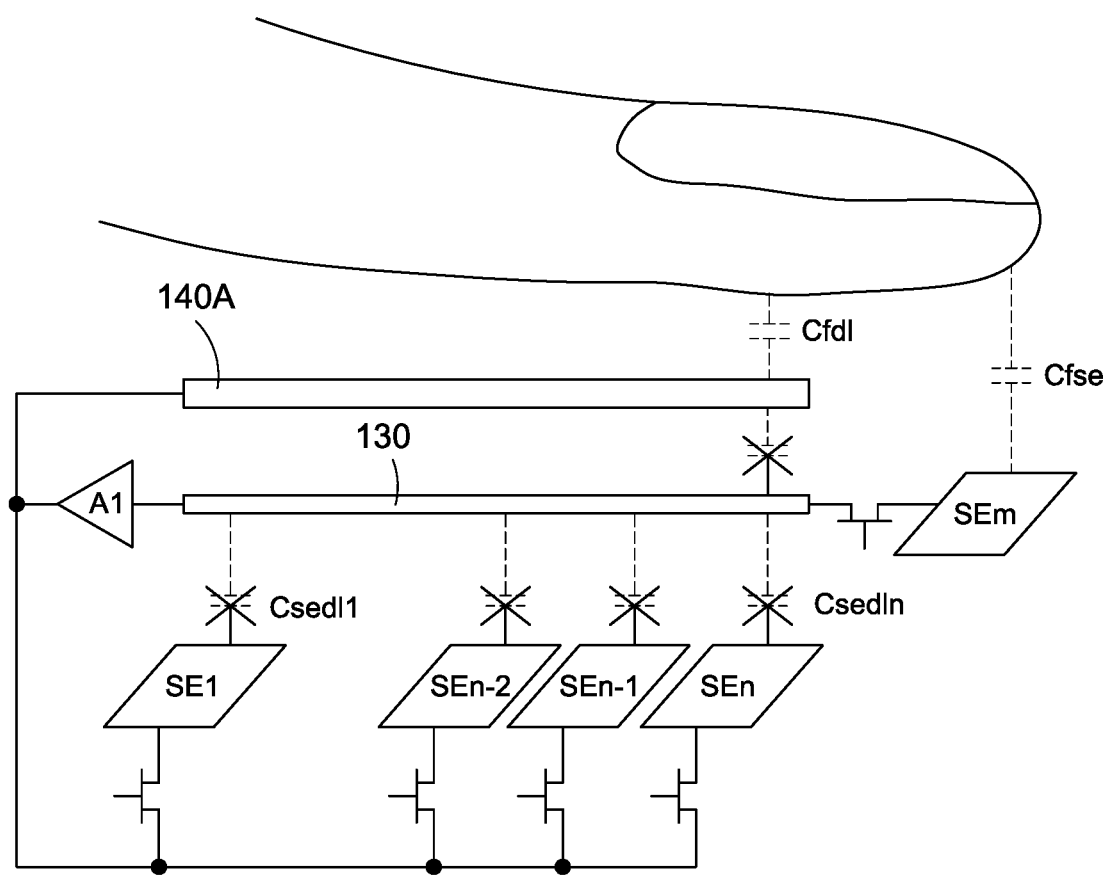
FIG. 4 shows an embodiment of the present invention, which uses capacitance-shielding wire to improve sensing accuracy for the fingerprint sensing capacitance.

FIGS. 1A to 1C respectively demonstrate the theory for the fingerprint sensing apparatus with capacitance-shielding wire according to the present invention. With reference to FIG. 1A, a first capacitance-shielding wire 140A and a second capacitance-shielding wire 140B are arranged adjacent to the data line 130. For example, the first capacitance-shielding wire 140A and the second capacitance-shielding wire 140B may be arranged atop and below the data line 130 respectively. The directions relevant to the location atop and below the data line 130 are referred to the user operation direction. However, according to the present invention, the first capacitance-shielding wire 140A and the second capacitance-shielding wire 140B can be such arranged that the data line 130 is sandwiched between the first capacitance-shielding wire 140A and the second capacitance-shielding wire 140B. For example, the first capacitance-shielding wire 140A and the second capacitance-shielding wire 140B may be arranged at left side and right side of the data line 130 respectively. Besides, if the noise source of the data line 130 is mainly from a single side (such as from a lower side of the data line 130), the fingerprint sensing apparatus of the present invention may also have only one capacitance-shielding wire as shown in FIG. 4. Therefore, the scope of the present invention is not limited to the specific example with two capacitance-shielding wires shown in FIG. 1A. As shown in FIG. 1A, the first capacitance-shielding wire 140A has a width W1, the second capacitance-shielding wire 140B has a width of W2 and the data line 130 has a width of W3. The provision of the first capacitance-shielding wire 140A and the second capacitance-shielding wire 140B to sandwich the data line 130 as shown in FIG. 1A may block noise from upper direction and lower direction of the data line 130. However, it will have serious crosstalk problem if the first capacitance-shielding wire 140A and the second capacitance-shielding wire 140B are not properly biased. If one end of the first capacitance-shielding wire 140A and one end of the second capacitance-shielding wire 140B are respectively connected to ground, and one end of the data line 130 is connected to a driver circuit (such as an amplifier A1) to output the fingerprint sensing signal, a first capacitance C1 is induced between the first capacitance-shielding wire 140A and the data line 130, a second capacitance C2 is induced between the second capacitance-shielding wire 140B and the data line 130. The first capacitance C1 and the second capacitance C2 cause crosstalk to the fingerprint sensing signal and influence the accuracy of the fingerprint sensing.

With reference to FIG. 1B, if the fingerprint sensing signal of the data line 130, which is the capacitance sensing result for a selected fingerprint sensing electrode is amplified by a driver circuit (such as an amplifier) A2 with gain larger than zero or equal to zero into a capacitance-eliminating signal and then the capacitance-eliminating signal is applied to the first capacitance-shielding wire 140A and the second capacitance-shielding wire 140B, the first capacitance C1 between the first capacitance-shielding wire 140A and the data line 130 becomes zero and the second capacitance C2 between the second capacitance-shielding wire 140B and the data line 130 also becomes zero. The provision of the first capacitance C1 and the second capacitance C2 will not cause crosstalk to the fingerprint sensing signal and accordingly will not influence the accuracy of the fingerprint sensing. The first capacitance-shielding wire 140A and the second capacitance-shielding wire 140B may further provide shielding effect for the data line 130. Namely, the fingerprint sensing apparatus with capacitance-shielding wire according to the present invention may accurately sense the fingerprint sensing capacitance Cfs (the sensing result generated by the pressing of user finger on the selected fingerprint sensing electrode and sent from the data line 130). In above description, the gain of the driver circuit A2 is larger than or equal to zero. During fingerprint sensing, the gain of the driver circuit A2 is larger than zero (such as 1) to perform non-inverting (in-phase) amplification to the fingerprint sensing signal.

With reference to FIG. 1C, if the fingerprint sensing signal of the data line 130 is amplified by a driver circuit (such as an amplifier) A2 with gain larger than zero or equal to zero into a capacitance-eliminating signal and then the capacitance-eliminating signal is applied to the first capacitance-shielding wire 140A, and if the fingerprint sensing signal of the data line 130 is also amplified by a driver circuit (such as an amplifier) A3 with gain larger than zero or equal to zero into another capacitance-eliminating signal and then the another capacitance-eliminating signal is applied to the second capacitance-shielding wire 140B, similarly, the first capacitance C1 between the first capacitance-shielding wire 140A and the data line 130 becomes zero and the second capacitance C2 between the second capacitance-shielding wire 140B and the data line 130 also becomes zero. The provision of the first capacitance C1 and the second capacitance C2 will not cause crosstalk to the fingerprint sensing signal and accordingly will not influence the accuracy of the fingerprint sensing such that the fingerprint sensing apparatus with capacitance-shielding wire according to the present invention may accurately sense the fingerprint sensing capacitance Cfs. Similarly, in above example shown in FIG. 1C, the gains of the driver circuits A2 and A3 are larger than or equal to zero. During fingerprint sensing, the gains of the driver circuits A2 and A3 are larger than zero (such as 1) to perform non-inverting (in-phase) amplification to the fingerprint sensing signal.

Figure 2:
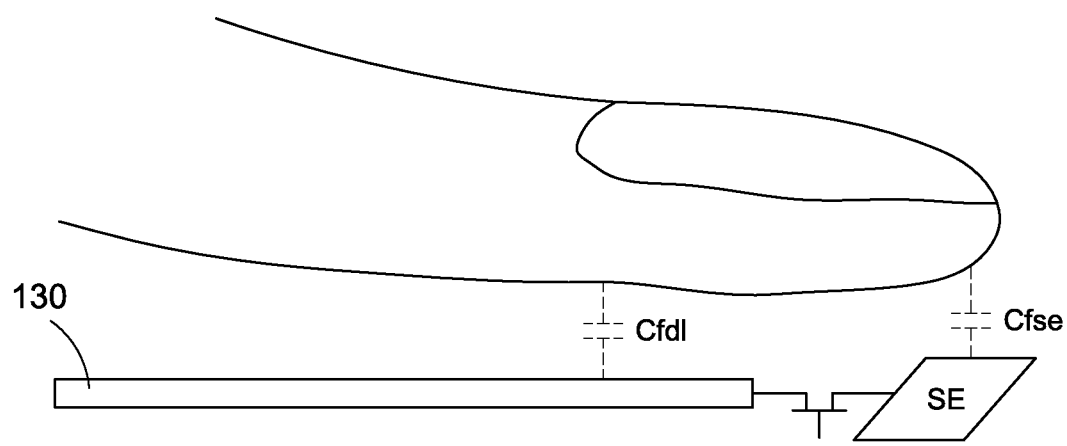
FIG. 2 shows the impact of data line on the measurement of fingerprint sensing capacitance in prior art.

FIG. 2 shows the impact of data line on the measurement of fingerprint sensing capacitance in prior art. As shown in this figure, the data line generally has considerable extension length with respect to the fingerprint sensing electrode SE. For example, if the length of the data line 130 is 20,000 um, the area there is 100,000 $um^2$, even though its width is only 5 um, which is smaller than the width (50 um) of the fingerprint sensing electrode SE. The area of the data line 130 is around 40 times of the area of the fingerprint sensing electrode SE, which is 50×50=2,500 $um^2$. In other word, if the data line 130 is close to the fingerprint sensing electrode SE, the capacitance Cfdl between the user finger and the data line 130 is 40 times of the fingerprint sensing capacitance Cfse. The sensing accuracy of fingerprint is seriously influenced by the data line 130.

Figure 3:
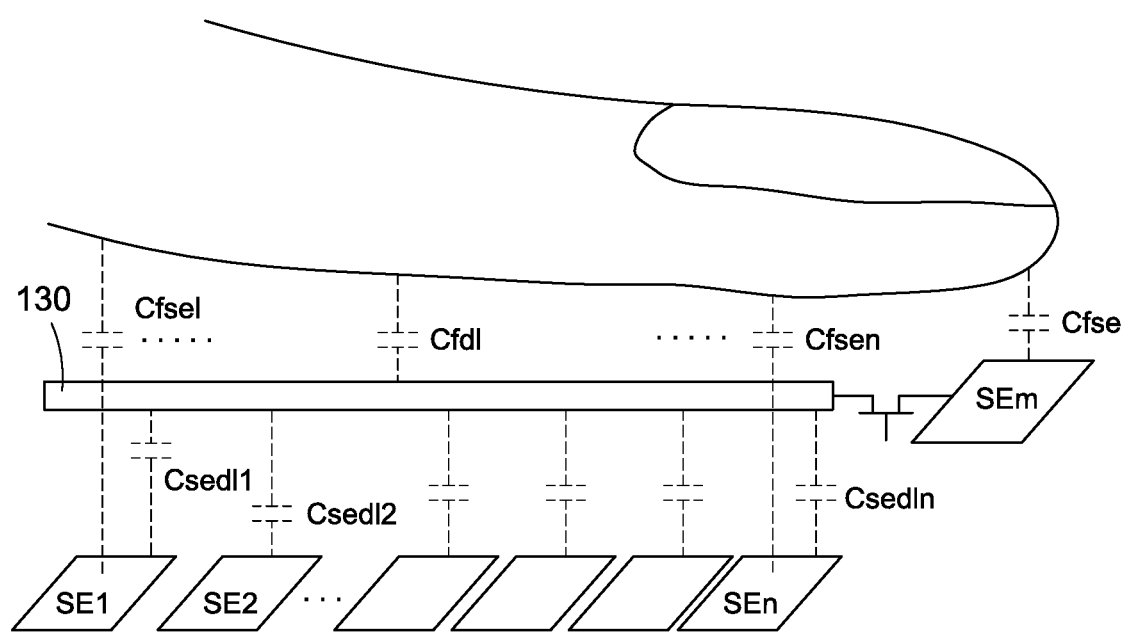
FIG. 3 also shows the impact of data line on the measurement of fingerprint sensing capacitance in prior art.

FIG. 3 also shows the impact of data line on the measurement of fingerprint sensing capacitance in prior art. As shown in this figure, beside the influence of the data line 130, the non-selected fingerprint sensing electrodes SE1-SEn near the data line 130 have capacitances Cfse1-Cfsen with respect to the user finger, and it also has capacitances Cfsed11-Cfsed1$n$ between the data line 130 and the non-selected fingerprint sensing electrode SE1-SEn. The capacitances Cfsed11-Cfsed1$n$ will also influence the sensing accuracy of the fingerprint sensing capacitance Cfse for the selected fingerprint sensing electrode SEm. More particularly, the number of the non-selected fingerprint sensing electrodes SE1-SEn is much more than the number of the selected fingerprint sensing electrode SEm, which imposes a more serious problem to the sensing accuracy of the fingerprint sensing capacitance Cfse.

FIG. 4 shows an embodiment of the present invention, which uses capacitance-shielding wire to improve sensing accuracy for the fingerprint sensing capacitance. With reference also to FIGS. 1B and 1C, at least one capacitance-shielding wire (such as the first capacitance-shielding wire 140A in FIG. 4) is provided for the data line 130, besides, the fingerprint sensing signal of the data line 130 is amplified by a driver circuit (such as an amplifier) A1 with gain larger than zero or equal to zero into a capacitance-eliminating signal. The capacitance-eliminating signal is applied to the first capacitance-shielding wire 140A. Similarly, there is nearly no capacitance (no voltage difference) between the first capacitance-shielding wire 140A and the data line 130. Besides, the capacitance-eliminating signal can also be applied to the non-selected fingerprint sensing electrodes SE1-SEn such that there is no capacitance between the non-selected fingerprint sensing electrodes SE1-SEn and the data line 130. Therefore, the fingerprint sensing capacitance Cfse for the selected fingerprint sensing electrode SEm can be more accurately sensed. In the embodiment shown in FIG. 4, even though only one capacitance-shielding wire (namely the first capacitance-shielding wire 140A) and the capacitance-eliminating signal is also applied to the non-selected fingerprint sensing electrodes SE1-SEn; however, according to another possible implement of the present invention, two capacitance-shielding wires, namely, the first capacitance-shielding wire 140A and the second capacitance-shielding wire 140B are arranged atop and below the data line 130 respectively. Besides, the capacitance-eliminating signal is respectively applied to the first capacitance-shielding wire 140A and the second capacitance-shielding wire 140B to reduce interference. In the embodiment shown in FIG. 4, the gain of the driver circuit A1 is larger than or equal to zero. During fingerprint sensing, the gain of the driver circuit A1 is larger than zero (such as 1) to perform non-inverting (in-phase) amplification to the fingerprint sensing signal for generating the capacitance-eliminating signal.

Figure 9:
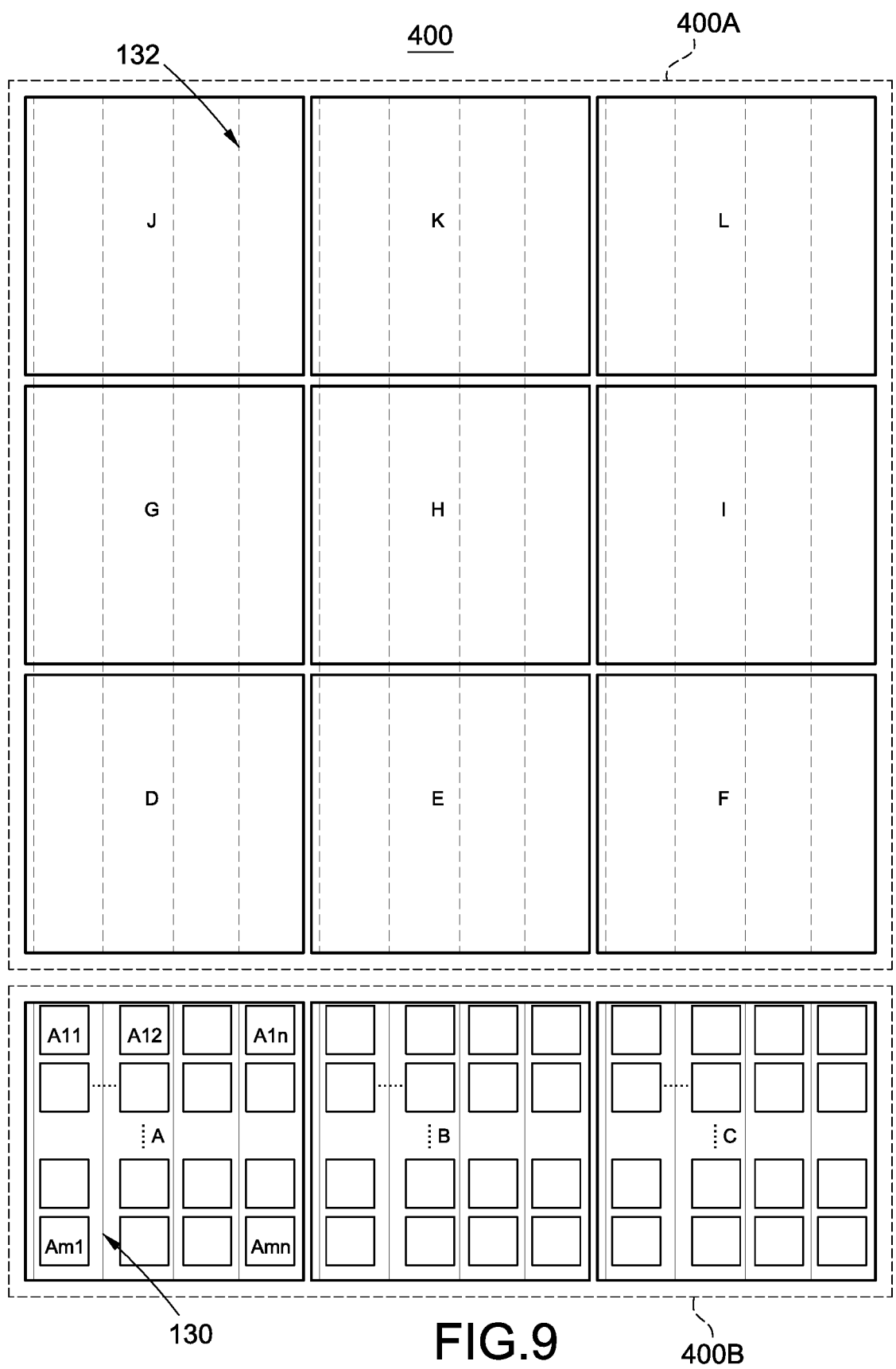
FIG. 9 shows the touch display area and the fingerprint-sensing and touch-display area in a display panel.

FIG. 9 shows the touch display area 400A and the fingerprint-sensing and touch-display area 400B in a display panel 400. In the display panel 400 of a portable electronic device, it often provides a touch display area 400A for user input and for displaying information for user, and a fingerprint sensing region to identify the user. The resolution of the fingerprint sensing is much higher than the resolution of touch sensing. Therefore, according to one embodiment of the present invention, a plurality of fingerprint sensing electrodes A11 . . . A1n . . . Am1 . . . Amn can be used to construct a fingerprint-sensing and touch-display unit A, while a plurality of fingerprint-sensing and touch-display units A, B and C can be used to construct the fingerprint-sensing and touch-display area 400B. The display panel 400 comprises the touch display area 400A (comprising a plurality of touch sensing electrodes D, E . . . K, L) and the fingerprint-sensing and touch-display area 400B. In above description, the area of each touch sensing electrode is more than 50 times of the area of the fingerprint sensing electrode. For example, the ratio can be 50-100 times or even 1000 times. Besides, the density of the fingerprint sensing electrodes A11 . . . A1n . . . Am1 . . . Amn is much higher than the density of the touch sensing electrodes D, E . . . K, L, the data lines in the fingerprint-sensing and touch-display area 400B also have higher density than the counterpart in the touch display area 400A. To render the touch display area 400A and the fingerprint-sensing and touch-display area 400B (having densely arranged fingerprint sensing electrodes) to have the same or similar light transparency, a plurality of dummy data lines 132 can be provided in the touch display area 400A. The dummy data lines 132 may have the same or similar arrangement density as that of the data lines 130 in the fingerprint-sensing and touch-display area 400B and need not connect to any control circuit. Therefore, the touch display area 400A and the fingerprint-sensing and touch-display area 400B have the same or similar light transparency to enhance visual comfort of user during operation.

Figure 5:
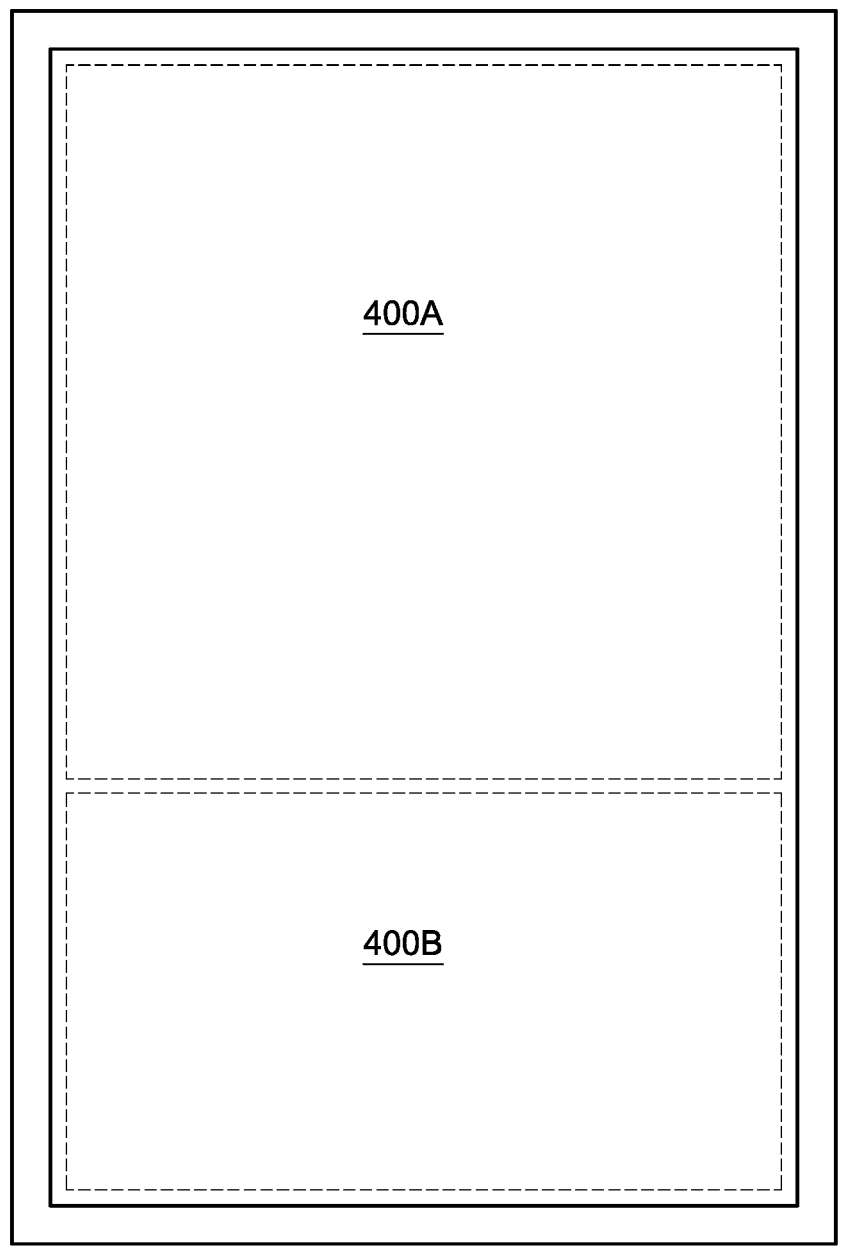
FIG. 5 is a view showing the touch display area and the fingerprint-sensing and touch-display area in a display panel.

As shown in FIG. 5, the display panel 400 comprises, for example, an upper portion and a lower portion, namely the touch display area 400A at the upper portion and the fingerprint-sensing and touch-display area 400B at the lower portion. With reference also to FIG. 9, the fingerprint-sensing and touch-display unit A in the fingerprint-sensing and touch-display area 400B comprises a plurality of fingerprint sensing electrodes A11 . . . A1n . . . Am1 . . . Amn. With reference also to FIGS. 1B and 1C, the first capacitance-shielding wire 140A and the second capacitance-shielding wire 140B are arranged atop and below the data line 130 respectively. Besides, the capacitance-eliminating signal with the same phase as the fingerprint sensing signal is respectively applied to the first capacitance-shielding wire 140A and the second capacitance-shielding wire 140B to reduce interference. Therefore, the fingerprint-sensing and touch-display area 400B in the display panel 400 shown in FIG. 5 also has better sensing accuracy and has less crosstalk in data line.

Figure 6:
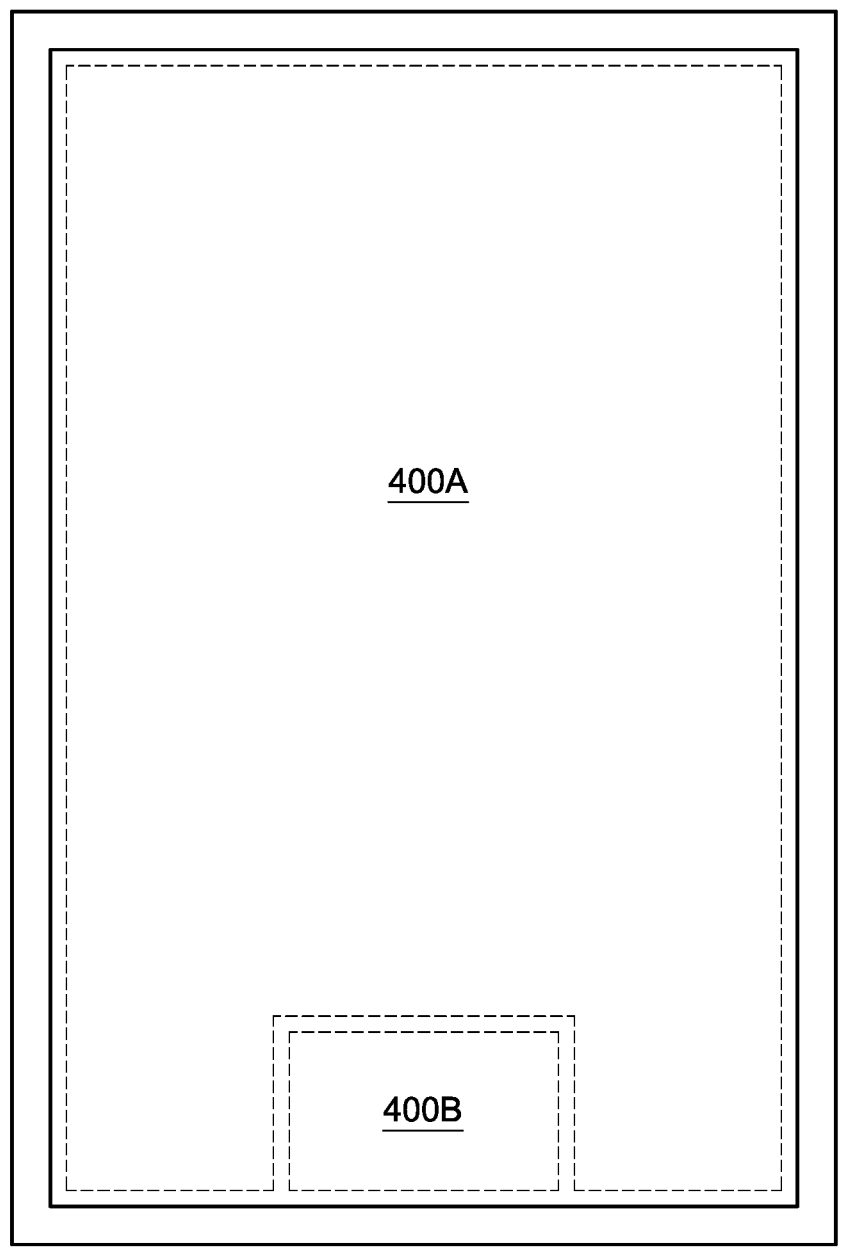
FIG. 6 is another view showing the touch display area and the fingerprint-sensing and touch-display area in a display panel.

As shown in FIG. 6, the shown display panel 400 also comprises the touch display area 400A at the upper portion and the fingerprint-sensing and touch-display area 400B at the lower portion. However, in comparison with embodiment in FIG. 5, the fingerprint-sensing and touch-display area 400B in FIG. 6 has smaller area. Similarly, with reference also to FIG. 9, the fingerprint-sensing and touch-display unit A in the fingerprint-sensing and touch-display area 400B comprises a plurality of fingerprint sensing electrodes A11 . . . A1n . . . Am1 . . . Amn. With reference also to FIGS. 1B and 1C, the first capacitance-shielding wire 140A and the second capacitance-shielding wire 140B are arranged atop and below the data line 130 respectively. Besides, the capacitance-eliminating signal with the same phase as the fingerprint sensing signal is respectively applied to the first capacitance-shielding wire 140A and the second capacitance-shielding wire 140B to reduce interference. Therefore, the fingerprint-sensing and touch-display area 400B in the display panel 400 shown in FIG. 6 also has better sensing accuracy and has less crosstalk in data line.

Figure 7A:
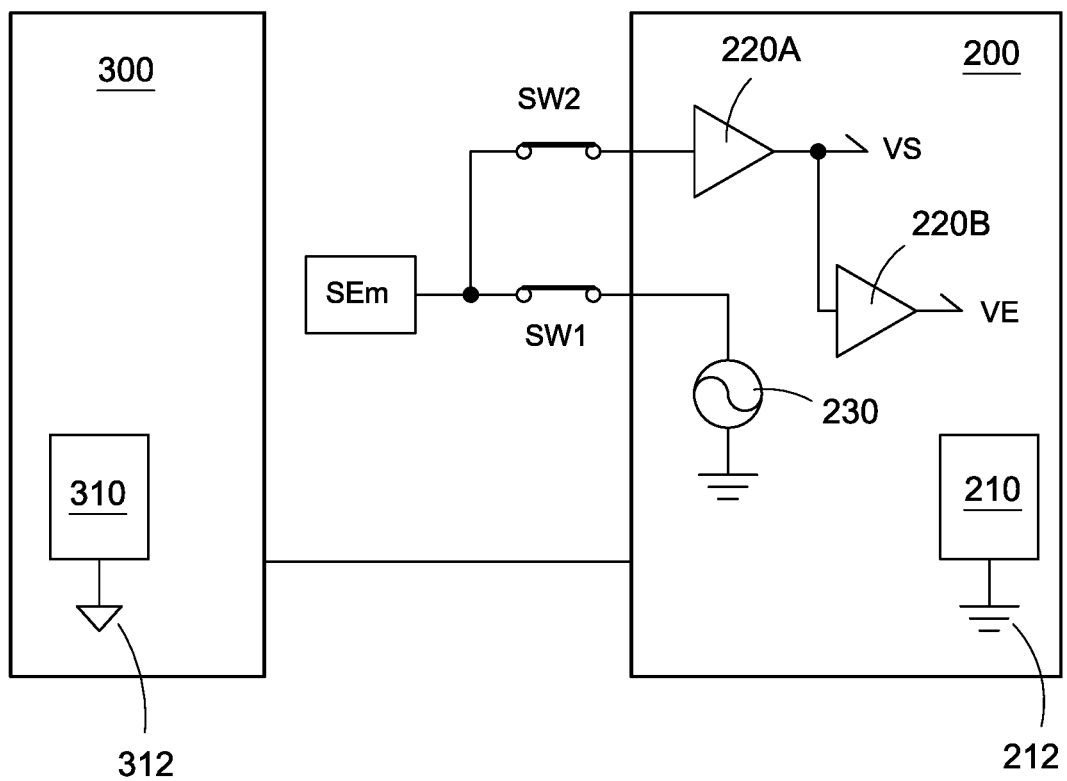
FIGS. 7A and 7B are the circuit block diagrams for the fingerprint sensing apparatus with capacitance-shielding wire according to the present invention.

FIG. 7A is the circuit block diagram for the fingerprint sensing apparatus with capacitance-shielding wire according to the present invention. The fingerprint sensing apparatus 10 with capacitance-shielding wire adopts self-capacitance mechanism and has a fingerprint-touch sensing circuit 200 and a display controller 300. The fingerprint-touch sensing circuit 200 has a first power source 210 and a first ground 212, and the display controller 300 has a second power source 310 and a second ground 312, where the first ground 212 and the second ground 312 are different grounds. The fingerprint-touch sensing circuit 200 further comprises a capacitance-exciting signal source 230, a first amplifier 220A and a second amplifier 220B. The fingerprint sensing apparatus 10 also comprises a first switch SW1 and a second switch SW2. With reference to FIG. 7A, during fingerprint sensing stage (or during touch sensing stage, with reference also to FIG. 9, the plurality of fingerprint sensing electrodes A11 . . . A1n . . . Am1 . . . Amn are used to construct the fingerprint-sensing and touch-display unit A such that the fingerprint-sensing and touch-display unit A can conduct touch sensing with less interference), the first switch SW1 and the second switch SW2 are turned on. Therefore, the capacitance-exciting signal sent from the capacitance-exciting signal source 230 can be sent to the selected fingerprint sensing electrode SEm through the first switch SW1 and the capacitance sensing signal (associated with the fingerprint or touch sensing result) on the selected fingerprint sensing electrode SEm can be sent to the first amplifier 220A through the second switch SW2. The capacitance sensing signal is processed by the first amplifier 220A to generate a fingerprint sensing signal VS. Besides, the fingerprint sensing signal VS is also sent to the second amplifier 220B (which is a driver circuit with gain larger than zero or equal to zero) to process into a capacitance-eliminating signal VE having the same phase as that of the fingerprint sensing signal VS. With reference also to FIGS. 1B and 1C, the first capacitance-shielding wire 140A and the second capacitance-shielding wire 140B are arranged atop and below the data line 130 respectively. Besides, the fingerprint-touch sensing circuit 200 sends the capacitance-eliminating signal VE with the same phase as the fingerprint sensing signal VS respectively to the first capacitance-shielding wire 140A and the second capacitance-shielding wire 140B to reduce interference. Therefore, the fingerprint sensing apparatus 10 with capacitance-shielding wire shown in FIG. 7A also has better sensing accuracy and has less crosstalk in data line. In above description for FIG. 7A, the gain of the second amplifier (driver circuit) 220B is larger than or equal to zero. During fingerprint sensing or touch sensing, the gains of the second amplifier 220B is larger than zero (such as 1) to perform non-inverting (in-phase) amplification to the fingerprint sensing signal VS and to generate the capacitance-eliminating signal VE. Besides, in fingerprint sensing or touch sensing operation, the fingerprint-touch sensing circuit 200 and the display controller 300 are connected through only one physical connection wire. The first ground 212 and the second ground 312 are different grounds. Therefore, there is no common current loop between the fingerprint-touch sensing circuit 200 and the display controller 300 during fingerprint or touch sensing. The fingerprint sensing or touch sensing accuracy can be enhanced.

Figure 7B:
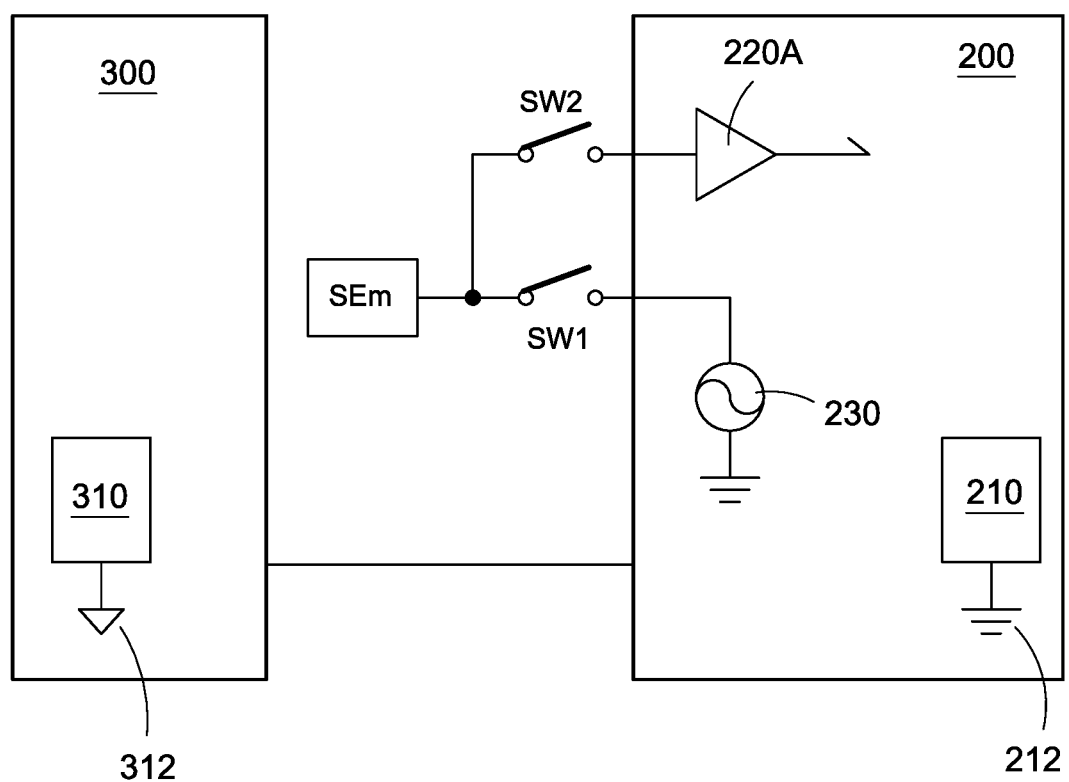

FIG. 7B is another circuit block diagram for the fingerprint sensing apparatus with capacitance-shielding wire according to the present invention, where the fingerprint sensing apparatus 10 is in non-fingerprint sensing or non-touch sensing operation (for example, in display operation or signal communication operation). In this stage, the first switch SW1 and the second switch SW2 are turned off such that the capacitance-exciting signal of the capacitance-exciting signal source 230 is not sent to the selected fingerprint sensing electrode SEm. Besides, in this stage, the fingerprint-touch sensing circuit 200 and the display controller 300 can be connected by two conductive wires instead of one physical connection wire. Therefore, the fingerprint-touch sensing circuit 200 can be charged by the display controller 300 or vice versa, or the fingerprint-touch sensing circuit 200 can communicate with the display controller 300.

Figure 8A:
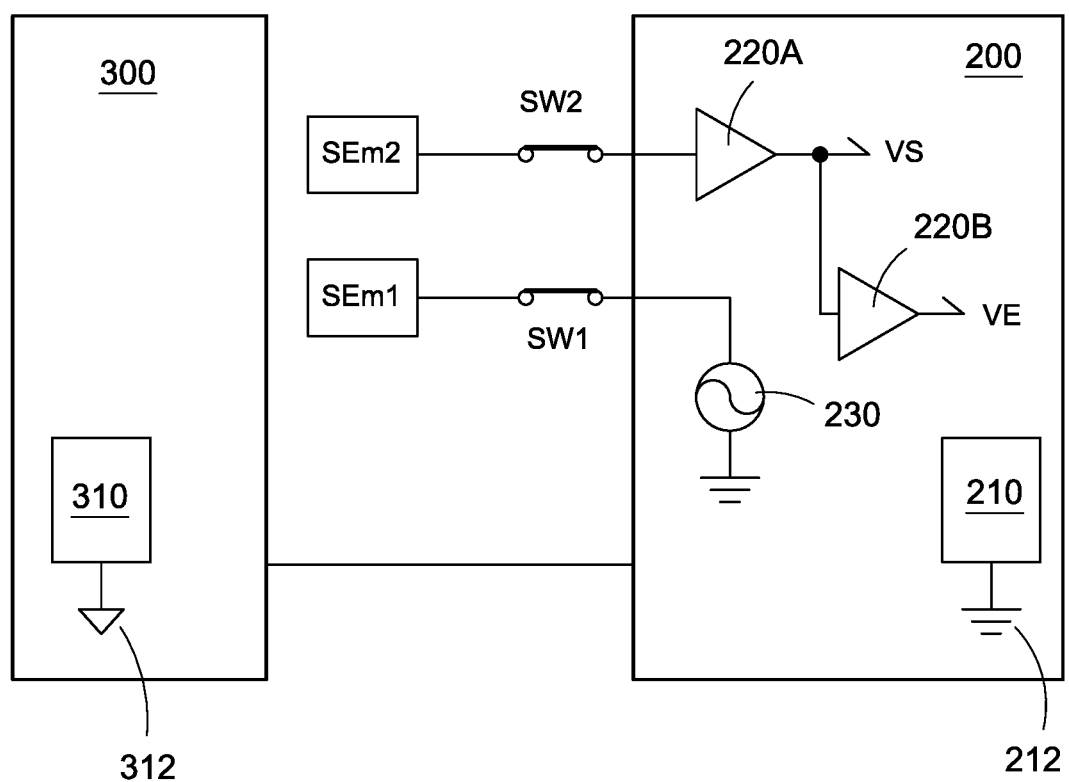
FIGS. 8A and 8B are the circuit block diagrams for the fingerprint sensing apparatus with capacitance-shielding wire according to the present invention.

FIG. 8A is still another circuit block diagram for the fingerprint sensing apparatus with capacitance-shielding wire according to the present invention. The fingerprint sensing apparatus 10 with capacitance-shielding wire adopts mutual-capacitance mechanism and has a fingerprint-touch sensing circuit 200 and a display controller 300. The fingerprint-touch sensing circuit 200 has a first power source 210 and a first ground 212, and the display controller 300 has a second power source 310 and a second ground 312, where the first ground 212 and the second ground 312 are different grounds. The fingerprint-touch sensing circuit 200 further comprises a capacitance-exciting signal source 230, a first amplifier 220A and a second amplifier 220B. The fingerprint sensing apparatus 10 also comprises a first switch SW1 and a second switch SW2. With reference to FIG. 8A, during fingerprint sensing stage or during touch sensing stage, the first switch SW1 and the second switch SW2 are turned on. Therefore, the capacitance-exciting signal sent from the capacitance-exciting signal source 230 can be sent to the selected fingerprint sensing electrode SEm1 through the first switch SW1. Besides, the fingerprint-touch sensing circuit 200 receives the capacitance sensing signal (associated with the fingerprint or touch sensing result) from another selected fingerprint sensing electrode SEm2 through the second switch SW2. The capacitance sensing signal is processed by the first amplifier to generate a fingerprint sensing signal VS. Besides, the fingerprint sensing signal VS is also sent to the second amplifier 220B (which is a driver circuit with gain larger than zero or equal to zero) to process into a capacitance-eliminating signal VE having the same phase as that of the fingerprint sensing signal VS. With reference also to FIGS. 1B and 1C, the first capacitance-shielding wire 140A and the second capacitance-shielding wire 140B are arranged atop and below the data line 130 respectively. Besides, the fingerprint-touch sensing circuit 200 sends the capacitance-eliminating signal VE with the same phase as the fingerprint sensing signal VS respectively to the first capacitance-shielding wire 140A and the second capacitance-shielding wire 140B to reduce interference. Therefore, the fingerprint sensing apparatus 10 with capacitance-shielding wire shown in FIG. 8A also has better sensing accuracy and has less crosstalk in data line. In above description for FIG. 8A, the gain of the second amplifier (driver circuit) 220B is larger than or equal to zero. During fingerprint sensing or touch sensing, the gain of the second amplifier 220B is larger than zero (such as 1) to perform non-inverting (in-phase) amplification to the fingerprint sensing signal VS and to generate the capacitance-eliminating signal VE. Besides, in fingerprint sensing or touch sensing operation, the fingerprint-touch sensing circuit 200 and the display controller 300 are connected through only one physical connection wire. The first ground 212 and the second ground 312 are different grounds. Therefore, there is no common current loop between the fingerprint-touch sensing circuit 200 and the display controller 300 during fingerprint or touch sensing. The fingerprint sensing or touch sensing accuracy can be enhanced.

Figure 8B:
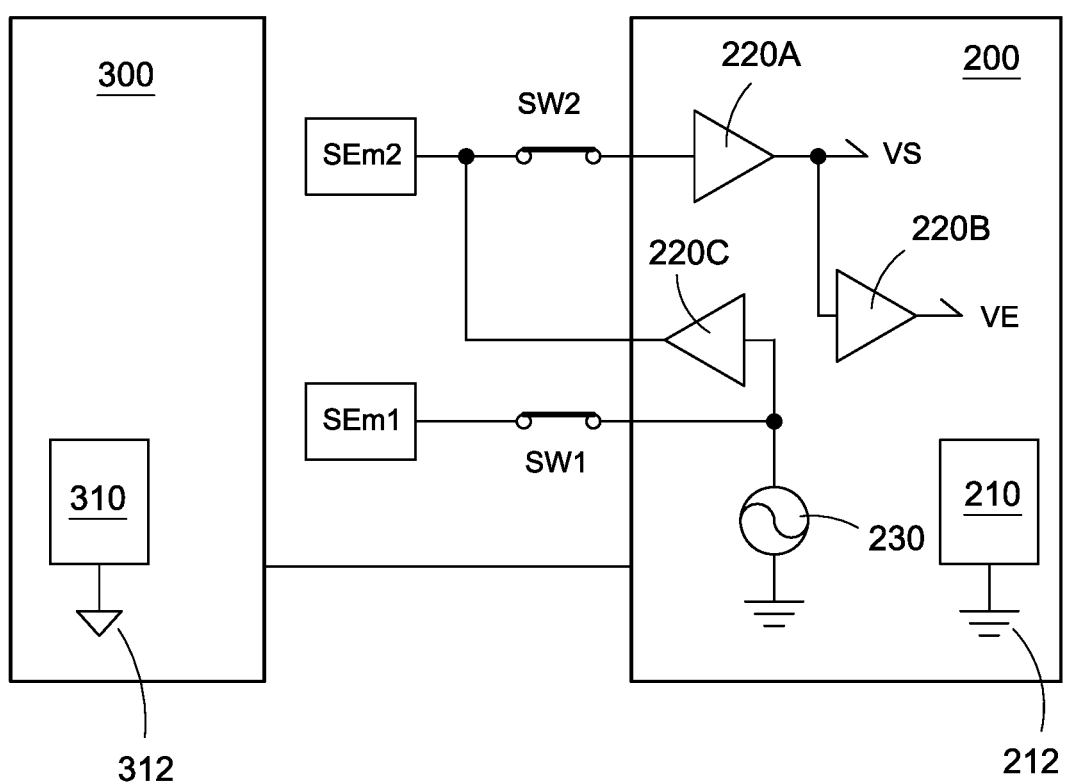

FIG. 8B is still another circuit block diagram for the fingerprint sensing apparatus with capacitance-shielding wire according to the present invention. The fingerprint sensing apparatus 10 with capacitance-shielding wire adopts self/mutual-capacitance mechanism and has a fingerprint-touch sensing circuit 200 and a display controller 300. The fingerprint-touch sensing circuit 200 has a first power source 210 and a first ground 212, and the display controller 300 has a second power source 310 and a second ground 312, where the first ground 212 and the second ground 312 are different grounds. The fingerprint-touch sensing circuit 200 further comprises a capacitance-exciting signal source 230, a first amplifier 220A, a second amplifier 220B and a third amplifier 220C. The fingerprint sensing apparatus 10 also comprises a first switch SW1 and a second switch SW2. With reference to FIG. 8B, during fingerprint sensing stage or during touch sensing stage, the first switch SW1 and the second switch SW2 are turned on. Therefore, the capacitance-exciting signal sent from the capacitance-exciting signal source 230 can be sent to the selected fingerprint sensing electrode SEm1 through the first switch SW1, and sent to another selected fingerprint sensing electrode SEm2 (before sending to the another selected fingerprint sensing electrode SEm2, the capacitance-exciting signal is processed by the third amplifier 220C). Besides, the fingerprint-touch sensing circuit 200 receives the capacitance sensing signal (associated with the fingerprint or touch sensing result) from the another selected fingerprint sensing electrode SEm2 through the second switch SW2. The capacitance sensing signal is processed by the first amplifier to generate a fingerprint sensing signal VS. Besides, the fingerprint sensing signal VS is also sent to the second amplifier 220B (which is a driver circuit with gain larger than zero or equal to zero) to process into a capacitance-eliminating signal VE having the same phase as that of the fingerprint sensing signal VS. With reference also to FIGS. 1B and 1C, the first capacitance-shielding wire 140A and the second capacitance-shielding wire 140B are arranged atop and below the data line 130 respectively. Besides, the fingerprint-touch sensing circuit 200 sends the capacitance-eliminating signal VE with the same phase as the fingerprint sensing signal VS respectively to the first capacitance-shielding wire 140A and the second capacitance-shielding wire 140B to reduce interference. Therefore, the fingerprint sensing apparatus 10 with capacitance-shielding wire shown in FIG. 8B also has better sensing accuracy and has less crosstalk in data line. In above description for FIG. 8B, the gain of the second amplifier (driver circuit) 220B is larger than or equal to zero. During fingerprint sensing or touch sensing, the gains of the second amplifier 220B is larger than zero (such as 1) to perform non-inverting (in-phase) amplification to the fingerprint sensing signal VS and to generate the capacitance-eliminating signal VE. Besides, in fingerprint sensing or touch sensing operation, the fingerprint-touch sensing circuit 200 and the display controller 300 are connected through only one physical connection wire. The first ground 212 and the second ground 312 are different grounds. Therefore, there is no common current loop between the fingerprint-touch sensing circuit 200 and the display controller 300 during fingerprint or touch sensing. The fingerprint sensing or touch sensing accuracy can be enhanced.

Figure 10:
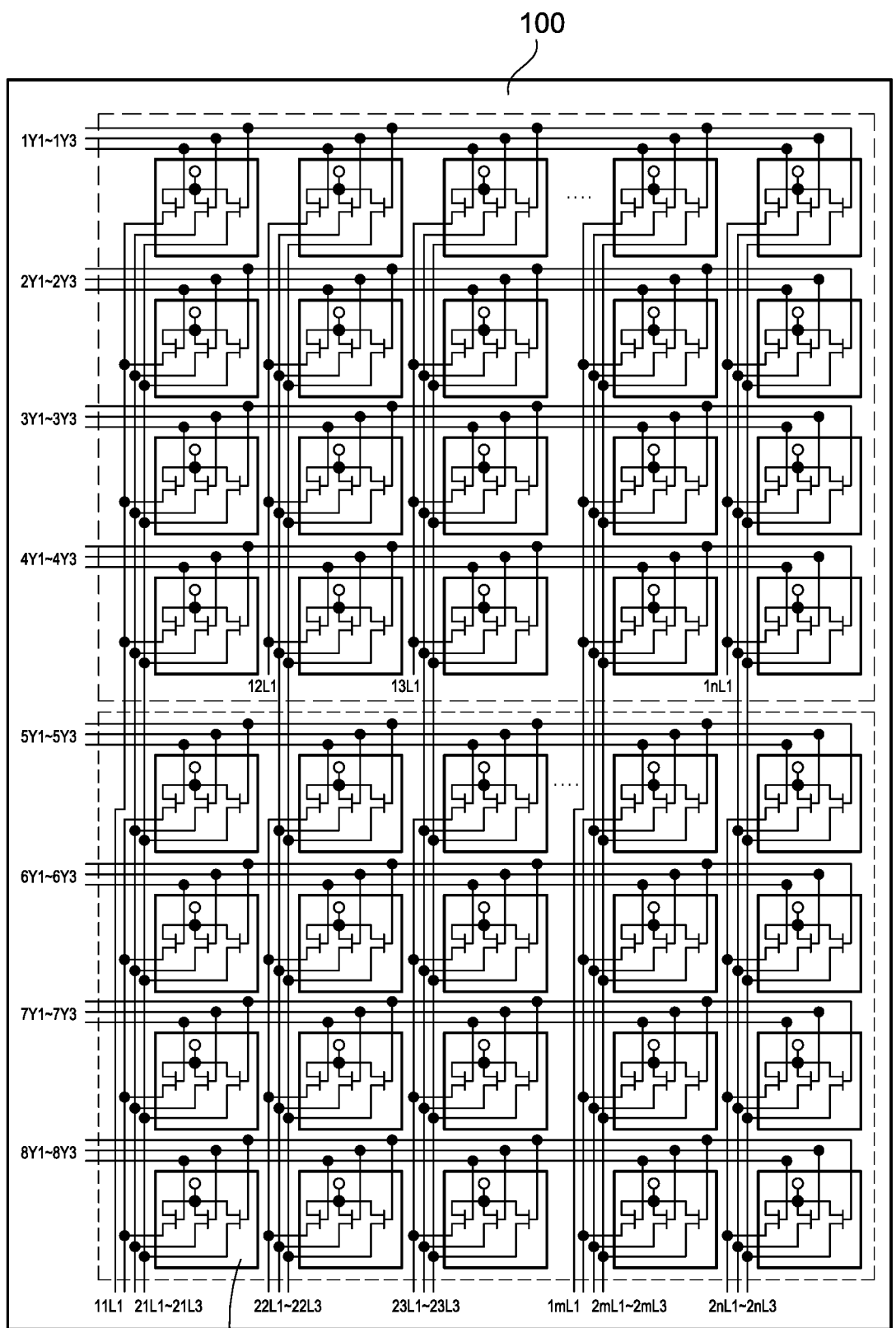
FIG. 10 shows the circuit block diagram of the fingerprint sensing apparatus with capacitance-shielding wire according to the present invention.

FIG. 10 shows the circuit block diagram of the fingerprint sensing apparatus with capacitance-shielding wire according to the present invention, which shows a plurality of fingerprint sensing electrodes and corresponding transistor switch sets. The plurality of transistor switch sets and the plurality of fingerprint sensing electrodes are in one-by-one correspondence. Even in FIG. 10 the transistor switch set corresponding to one fingerprint sensing electrode has three transistor switches (for example, thin-film transistor switches); however, according to the present invention, the transistor switch set corresponding to one fingerprint sensing electrode can only have one transistor switch and the selection function for fingerprint sensing electrode can still be achieved.

Figure 11A:
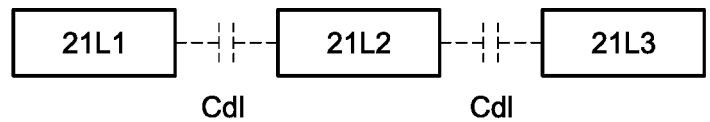
FIG. 11A is a schematic diagram showing the mutual capacitance between adjacent data lines.
Figure 11B:
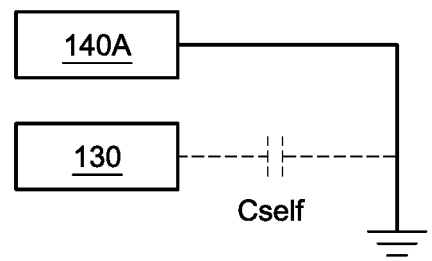
FIG. 11B is a schematic diagram showing the self-capacitance of data line.

FIG. 11A is a schematic diagram showing the mutual capacitance between adjacent data lines. As shown in this figure, mutual capacitance Cdl is present between the adjacent data lines 21L1 and 21L2, and mutual capacitance Cdl is present between the adjacent data lines 21L2 and 21L3. Due to the tiny separation between the adjacent data lines, the magnitude of the mutual capacitance Cdl is much larger than that of the fingerprint sensing capacitance Cfs, this seriously impacts the sensing accuracy for fingerprint. FIG. 11B is a schematic diagram showing the self-capacitance of data line 130. As shown in this figure, provided that the first capacitance-shielding wire 140A or a conduct near the data line 130 is grounded and the first capacitance-shielding wire 140A (or a conduct near the data line 130) is not suitably biased, there is a large self-capacitance Cself between the data line 130 and ground.

Figure 11C:
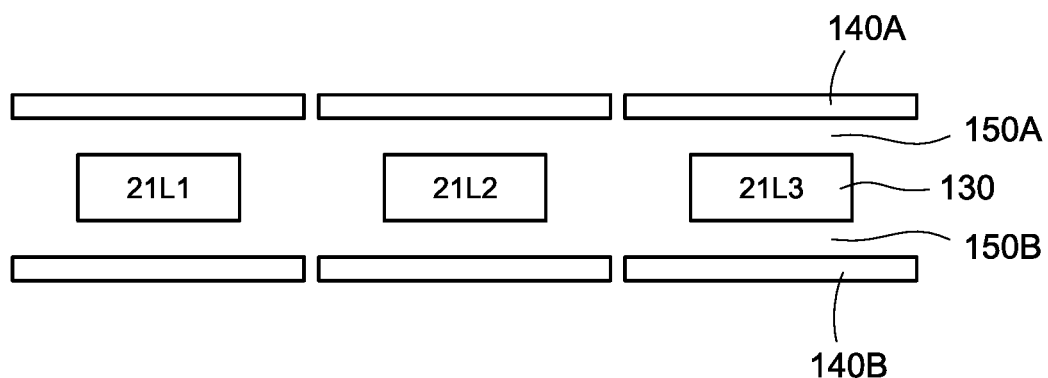
FIG. 11C shows the structure for the fingerprint sensing apparatus with capacitance-shielding wire according to the present invention.

FIG. 11C shows the structure for the fingerprint sensing apparatus with capacitance-shielding wire according to the present invention. As shown in this figure, the fingerprint sensing apparatus 10 may comprise, from top to bottom, a first capacitance-shielding wire 140A, a first insulating layer 150A, data lines 130 (21L1, 21L2, 21L3), a second insulating layer 150B and a second capacitance-shielding wire 140B. According to one possible implementation of the present invention, the width of the first capacitance-shielding wire 140A and the width of the second capacitance-shielding wire 140B may be larger than or equal to the width of the data line 130. Besides, generally the data lines 130 (21L1, 21L2, 21L3) are formed by etching metal layer with photo-lithography process to form separation therebetween, gap is present between the data lines 21L1, 21L2, 21L3. Provided that the thickness of the first insulating layer 150A and the thickness of the second insulating layer 150B are very thin (for example less than 1 um), the edge (peripheral) of the data lines 21L1, 21L2, 21L3 are almost covered or shielded by the first insulating layer 150A and the second insulating layer 150B. The cross talk, self-capacitance, and mutual-capacitance of the data line can be effectively eliminated if suitable bias is applied to the first capacitance-shielding wire 140A and the second capacitance-shielding wire 140B.

Figure 11D:
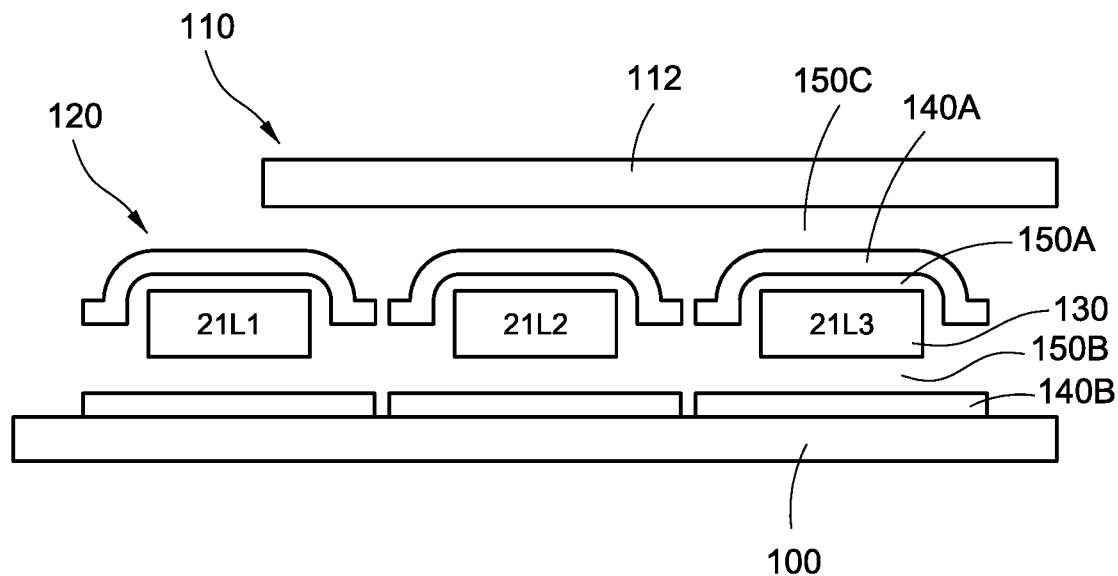
FIG. 11D shows another structure for the fingerprint sensing apparatus with capacitance-shielding wire according to the present invention.

FIG. 11D shows another structure for the fingerprint sensing apparatus with capacitance-shielding wire according to the present invention. As shown in this figure, the fingerprint sensing apparatus 10 may comprise, from top to bottom, a fingerprint electrode layer 110 (including a plurality of fingerprint sensing electrodes 112), a third insulating layer 150C, a first capacitance-shielding wire 140A, a first insulating layer 150A, data lines 130 (21L1, 21L2, 21L3), a second insulating layer 150B, a second capacitance-shielding wire 140B and a substrate 100. In this embodiment, the width of the first capacitance-shielding wire 140A and the width of the second capacitance-shielding wire 140B are slightly larger than the width of the data line 130. Therefore, two ends of the first capacitance-shielding wire 140A slightly droop, and the first capacitance-shielding wire 140A, together with the second capacitance-shielding wire 140B, encapsulates the data line 130. In this situation, the thicknesses of the first insulating layer 150A and the second insulating layer 150B can be made thicker to further reduce the self-capacitance and mutual-capacitance of the data line 130.

Figure 11E:
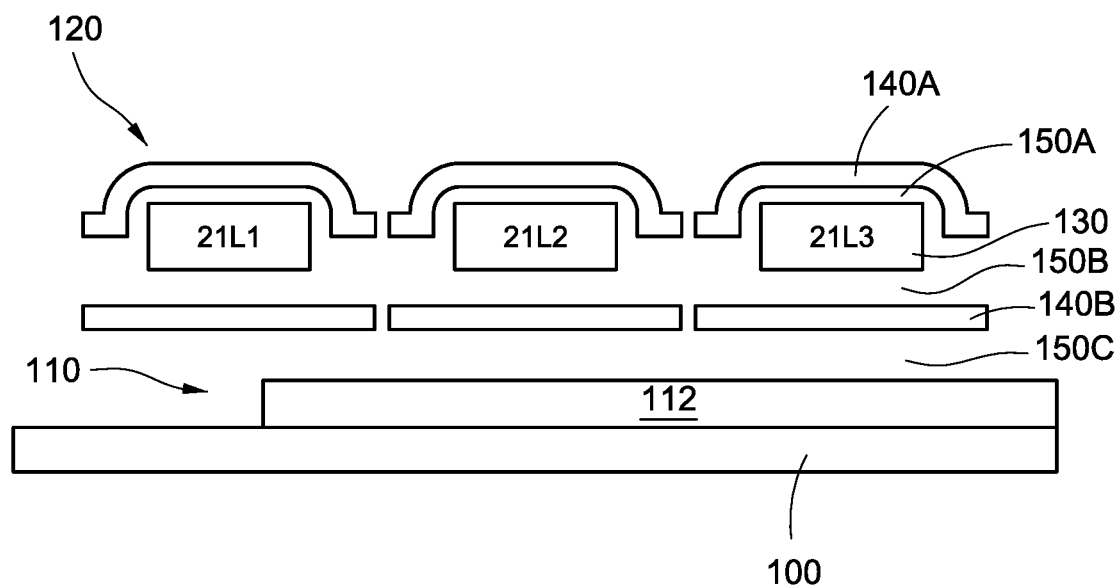
FIG. 11E shows still another structure for the fingerprint sensing apparatus with capacitance-shielding wire according to the present invention.

FIG. 11E shows still another structure for the fingerprint sensing apparatus with capacitance-shielding wire according to the present invention. The embodiment shown in FIG. 11E is similar to that shown in FIG. 11D, however, the fingerprint electrode layer 110 in FIG. 11E is directly formed on the substrate 100. Similarly, the width of the first capacitance-shielding wire 140A and the width of the second capacitance-shielding wire 140B are slightly larger than the width of the data line 130. Therefore, two ends of the first capacitance-shielding wire 140A slightly droops and, together with the second capacitance-shielding wire 140B, encapsulate the data line 130. In this situation, the thicknesses of the first insulating layer 150A and the second insulating layer 150B can be made thicker to further reduce the self-capacitance and mutual-capacitance of the data line 130. In the embodiments shown in FIGS. 11D and 11E, the substrate 100 can be a protection glass of a display screen, a silicon substrate of an integrated circuit, or a polymer thin film. In the embodiments described in the specification, the data line can be metallic conductive line, or transparent conductive line (such as indium tin oxide (ITO)). The fingerprint sensing electrodes are made from transparent conductive material.

To sum up, the fingerprint sensing apparatus with capacitance-shielding wire according to the present invention applies capacitance-eliminating signal respectively to the first capacitance-shielding wire and the second capacitance-shielding wire. Besides, the first capacitance-shielding wire and the second capacitance-shielding wire together sandwich the data line, therefore, the interference to the data line can be reduced to achieve more accurate sensing result.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A fingerprint sensing apparatus, comprising:
   a substrate;
   a fingerprint electrode layer comprising a plurality of fingerprint sensing electrodes;
   a transistor switch set layer comprising:
     a plurality of transistor switch sets, each of the transistor switch sets being in one-by-one correspondence with one of the plurality of fingerprint sensing electrodes; and
     a plurality of data lines, a plurality of first capacitance-shielding wires and a plurality of second capacitance-shielding wires, wherein each of the first capacitance-shielding wires and each of the second capacitance-shielding wires are provided for a corresponding data line in the plurality of data lines and sandwiching the corresponding data line, wherein the first capacitance-shielding wire is placed between the corresponding data line and a user finger to eliminate an influence of the user finger to the corresponding data line, wherein the first capacitance-shielding wires, the second capacitance-shielding wires and the sensing electrodes are arranged on different layers wherein the first capacitance-shielding wires and the second capacitance-shielding wires are longer than the fingerprint sensing electrodes;
   a fingerprint sensing circuit comprising a capacitance-exciting signal source and a driver circuit, wherein a gain of the driver circuit is larger than zero or equal to zero;
   wherein the fingerprint sensing circuit is configured to send a capacitance-exciting signal to a selected fingerprint sensing electrode through one of the plurality of transistor switch sets, to receive a fingerprint sensing signal from the selected fingerprint sensing electrode through the corresponding data line, and to process the fingerprint sensing signal with the driver circuit to output a capacitance-eliminating signal having a same phase as the fingerprint sensing signal, the fingerprint sensing circuit is further configured to send the capacitance-eliminating signal to the first capacitance-shielding wire and the second capacitance-shielding wire for preventing influence to the data line, and
   wherein the capacitance-eliminating signal is different with the fingerprint sensing signal;
   wherein the fingerprint sensing circuit comprises a fingerprint-touch sensing circuit and the fingerprint sensing apparatus further comprises a display panel comprising a display controller;
   wherein the fingerprint-touch sensing circuit and the display controller are connected through only one physical connection wire.

2. The fingerprint sensing apparatus in claim 1, wherein the second capacitance-shielding wire is arranged over a side of the corresponding data line opposite to the user finger to eliminate noise from the side of the corresponding data line.

3. The fingerprint sensing apparatus in claim 1, wherein a width of the first capacitance-shielding wire and a width of the second capacitance-shielding wire is not less than a width of the corresponding data line.

4. The fingerprint sensing apparatus in claim 1, wherein each of the transistor switch sets comprises at least one thin-film transistor.

5. The fingerprint sensing apparatus in claim 1, wherein the fingerprint sensing circuit is configured to send the capacitance-eliminating signal to the fingerprint sensing electrodes near the corresponding data line, thus prevent other sensing signal or noise of the fingerprint sensing electrodes near the corresponding data line from linking to the corresponding data line.

6. The fingerprint sensing apparatus in claim 1, wherein the substrate is a protection glass of a display screen, a silicon substrate of an integrated circuit, or a polymer thin film.

7. The fingerprint sensing apparatus in claim 1, wherein the data lines are metallic conductive lines or transparent conductive lines.

8. The fingerprint sensing apparatus in claim 7, wherein the transparent conductive lines are indium tin oxide lines.

9. The fingerprint sensing apparatus in claim 1, wherein the fingerprint sensing electrodes are made from transparent conductive material.

10. A fingerprint sensing apparatus, comprising:
    a substrate;
    a fingerprint electrode layer comprising a plurality of fingerprint sensing electrodes;
    a transistor switch set layer comprising:
      a plurality of transistor switch sets, each of the transistor switch sets being in one-by-one correspondence with one of the plurality of fingerprint sensing electrodes; and
      a plurality of data lines, a plurality of first capacitance-shielding wires and a plurality of second capacitance-shielding wires, wherein each of the first capacitance-shielding wires and each of the second capacitance-shielding wires are provided for a corresponding data line in the plurality of data lines and sandwiching the corresponding data line, wherein the first capacitance-shielding wire is placed between the corresponding data line and a user finger to eliminate an influence of the user finger to the corresponding data line;
    a fingerprint sensing circuit comprising a capacitance-exciting signal source and a driver circuit, wherein a gain of the driver circuit is larger than zero or equal to zero;

wherein the fingerprint sensing circuit is configured to send a capacitance-exciting signal to a selected fingerprint sensing electrode through one of the plurality of transistor switch sets, to receive a fingerprint sensing signal from the selected fingerprint sensing electrode through the corresponding data line, and to process the fingerprint sensing signal with the driver circuit to output a capacitance-eliminating signal having a same phase as the fingerprint sensing signal, the fingerprint sensing circuit is further configured to send the capacitance-eliminating signal to the first capacitance-shielding wire and the second capacitance-shielding wire for preventing influence to the data line, wherein the fingerprint sensing circuit comprises a fingerprint-touch sensing circuit and the fingerprint-touch sensing circuit comprises a first power source for providing power to the fingerprint sensing circuit, the fingerprint sensing apparatus further comprises a display panel comprising a display controller and the display controller comprising a second power source for providing power to the display panel, wherein the plurality of fingerprint sensing electrodes are arranged in a fingerprint-sensing and touch-display area of the display panel, and wherein the fingerprint-touch sensing circuit and the display controller are connected through only one physical connection wire.

11. The fingerprint sensing apparatus in claim 10, wherein the plurality of fingerprint sensing electrodes are configured to construct a touch sensing electrode for touch sensing function.

12. The fingerprint sensing apparatus in claim 11, wherein a touch display area of the display panel comprises a plurality of touch sensing electrodes for sensing touch on the touch display area, wherein an area of each of the touch sensing electrodes is more than 50 times of an area of one of the fingerprint sensing electrodes.

13. The fingerprint sensing apparatus in claim 12, further comprising a plurality of dummy data lines in the touch display area such that the touch display area and the fingerprint-sensing and touch-display area comprising the fingerprint sensing electrodes have the same or similar transparency.

* * * * *